United States Patent [19]
Enokihara et al.

[11] Patent Number: 5,459,800
[45] Date of Patent: Oct. 17, 1995

[54] OPTICAL MODULATION DEVICE AND METHOD OF DRIVING THE SAME

[75] Inventors: Akira Enokihara; Kentaro Setsune, both of Osaka, Japan

[73] Assignee: Matsushita Electric Industrial Co., Ltd., Osaka, Japan

[21] Appl. No.: 261,868

[22] Filed: Jun. 17, 1994

Related U.S. Application Data

[63] Continuation of Ser. No. 88,948, Jul. 12, 1993, abandoned.

[30] Foreign Application Priority Data

Jul. 30, 1992 [JP] Japan .................................... 4-203359
Oct. 6, 1992 [JP] Japan .................................... 4-266997

[51] Int. Cl.⁶ .................................................... G02B 6/10
[52] U.S. Cl. ............................................................ 385/3
[58] Field of Search .............................. 372/94; 385/1, 385/2, 3, 8, 9, 10, 11, 40, 129, 131, 133

[56] References Cited

U.S. PATENT DOCUMENTS 4,961,201  10/1990  Opower ........................ 372/94
5,001,523   3/1991  Lomashevich et al. ........ 372/94
5,166,991  11/1992  Jaeger et al. ................... 385/40

Primary Examiner—Rodney B. Bovernick
Assistant Examiner—John Ngo
Attorney, Agent, or Firm—Lowe, Price, LeBlanc & Becker

[57] ABSTRACT

An optical modulation device includes a split ring resonator having a slit. An optical waveguide exhibiting an electro-optical effect has a portion located near the slit of the resonator. A light beam can travel in the optical waveguide. A voltage can be induced in the resonator in response to a modulating signal. The induced voltage causes an electric field at the slit of the resonator. The electric field depends on the modulating signal. The electro-optical effect enables the light beam to be changed in response to the electric field. Thus, the light beam is modulated in accordance with the modulating signal. The resonator may be replaced by a split ring electrode.

16 Claims, 3 Drawing Sheets

1

OPTICAL MODULATION DEVICE AND METHOD OF DRIVING THE SAME

This application is a continuation of application Ser. No. 08/088,948 filed Jul. 12, 1993 now abandoned.

BACKGROUND OF THE INVENTION

1. Field of the Invention

This invention relates to an optical modulation device. This invention also relates to a method of driving an optical modulation device.

2. Description of the Prior Art

Semiconductor lasers are frequently used as light sources in optical communication systems. A typical way of modulating an optical signal is to control the injection current of a semiconductor laser in response to a modulating signal (an information signal). However, it is generally difficult to operate a semiconductor laser at higher than several GHz frequencies by such direct modulation because of characteristics thereof which relate to a carrier life time.

External electro-optic waveguide modulators using dielectric crystals can perform higher-frequency modulation. A typical electro-optic waveguide modulator includes a transmission line and an optical waveguide. The transmission line serves as a modulating electrode which enables a modulating signal to propagate on an electro-optical crystal. The optical waveguide extends near the transmission line. An electric field is induced around the modulating electrode in response to the modulating signal. The electro-optical effect causes the refractive indices of the optical waveguide to vary with the induced electric field. Accordingly, the phase of a light wave in the optical waveguide is varied in response to the modulating signal so that optical modulation is realized.

General electro-optical crystals such as an $LiNbO_3$ crystal do not have large electro-optical coefficients. Thus, in an electro-optical modulator, it is important to effectively apply a modulating electric field to an optical waveguide to attain a good modulation efficiency.

SUMMARY OF THE INVENTION

It is an object of this invention to provide an improved optical modulation device.

It is another object of this invention to provide a method of driving an optical modulation device.

A first aspect of this invention provides an optical modulation device comprising a split ring resonator having a slit; and an optical waveguide exhibiting an electro-optical effect and having a portion located near the slit of the resonator.

A second aspect of this invention provides a method of driving an optical modulation device comprising a split ring resonator having a slit, and an optical waveguide exhibiting an electro-optical effect and having a portion located near the slit of the resonator, the method comprising the steps of applying a light beam to the optical waveguide; and inducing a voltage in the resonator in response to a modulating signal.

A third aspect of this invention provides an optical modulation device comprising a split ring electrode having a slit; and an optical waveguide exhibiting an electro-optical effect and having a portion located near the slit of the electrode.

A fourth aspect of this invention provides a method of driving an optical modulation device comprising a split ring electrode having a slit, and an optical waveguide exhibiting an electro-optical effect and having a portion located near the slit of the electrode, the method comprising the steps of applying a light beam to the optical waveguide; and feeding a modulating signal to the electrode.

DESCRIPTION OF THE FIRST PREFERRED EMBODIMENT

Figure 1:
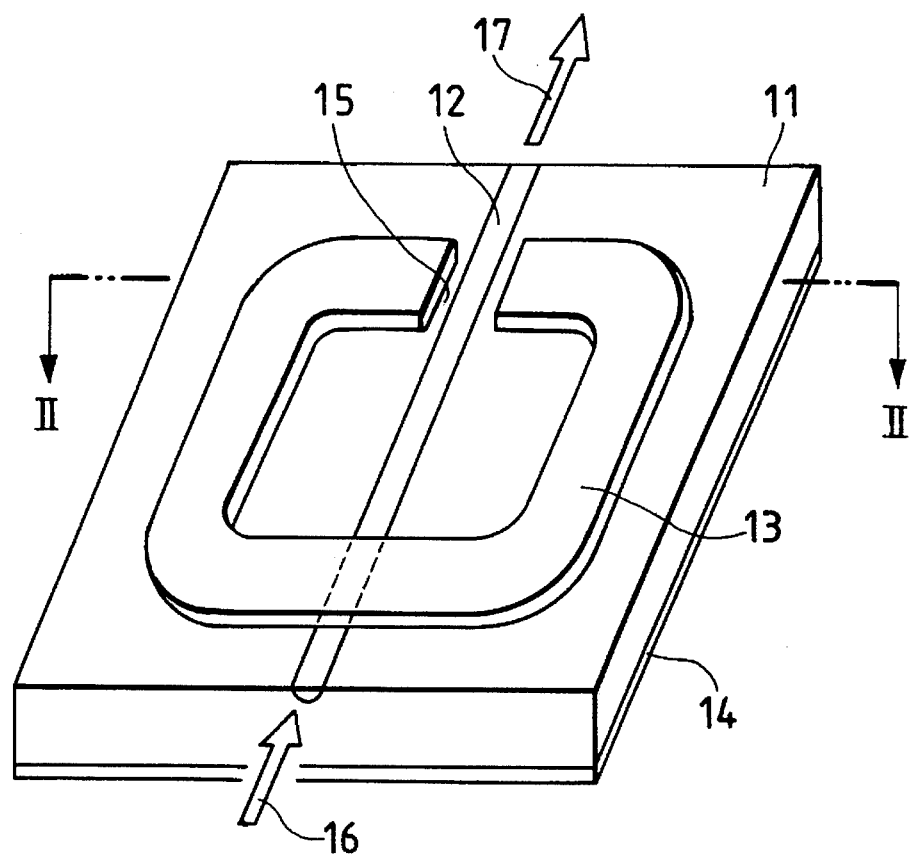
FIG. 1 is a perspective view of an optical modulation device according to a first embodiment of this invention.
Figure 2:
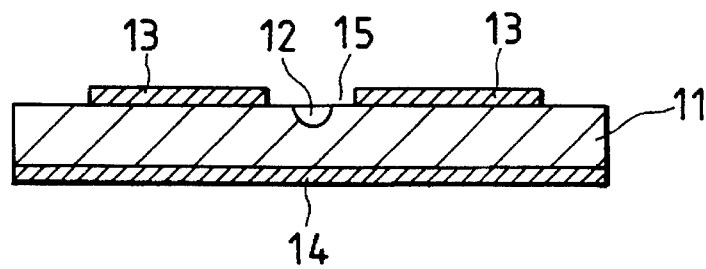
FIG. 2 is a sectional view taken along the line II—II of FIG. 1.

With reference to FIGS. 1 and 2, an optical modulation device (optical modulation element) includes a substrate 11 exhibiting an electro-optical effect. The substrate 11 has a shape of a rectangular or square flat plate. The substrate 11 is made of, for example, a single crystal of $LiNbO_3$ (lithium niobate).

An optical waveguide or an optical path 12 is formed in an upper surface of the substrate 11 by a suitable process such as a metal diffusion process or a Ti diffusion process. The optical waveguide 12 exhibits the electro-optical effect. The optical waveguide 12 extends between opposite sides of the substrate 11. After the formation of the optical waveguide 12, a resonator 13 is formed on the upper surface of the substrate 11 by suitable processes such as a sputtering process, a process of photolithography, and a reactive ion etching process.

The resonator 13 is of a split ring type (split loop type), including a micro-strip line. Specifically, the resonator 13 has a rectangular loop or ring conductor with a slit (an opening or split) 15. In FIG. 1, as viewed from the top, the optical waveguide 12 extends along a central line with respect to the rectangular ring conductor. In addition, the optical waveguide 12 extends through the slit 15. Thus, a portion of the optical waveguide 12 extends near the slit 15. The rectangular loop conductor is preferably symmetrical with respect to the central line. A ground plane 14 including a metal film is formed on a lower surface of the substrate 11 by a suitable process such as a vapor deposition process.

An input light beam 16 is applied to one end of the optical waveguide 12. The input light beam 16 enters the optical waveguide 12 via the end thereof and then travels along the optical waveguide 12, exiting from the other end of the optical waveguide 12 and forming an output light beam 17. While the input light beam 16 travels along the optical waveguide 12, it passes through a region near the slit 15 in the resonator 13. In cases where the resonator 13 is driven to perform resonance responsive to a modulating signal by a suitable method, an electric field depending on the modulating signal is developed in the slit 15 and hence the refractive indices of the optical waveguide 12 are varied with the electric field due to the electro-optical effect. Specifically, the developed electric field has an amplitude which depends on the modulating signal. Therefore, the phase of the output light beam 17 is varied in accordance with the modulating signal. In this way, the input light beam 16 is phase-modulated with the modulating signal.

It should be noted that the loop conductor of the resonator 13 may have other shapes such as a circular shape.

As shown in FIG. 1, the loop conductor of the resonator 13 has open ends which face each other at the slit 15. The drive of the resonator 13 produces a voltage in the loop conductor thereof. The amplitude of the voltage in the loop conductor is maximized at the open ends thereof. In addition, the voltages at the open ends of the loop conductor have opposite phases respectively. Therefore, the amplitude of the difference between the voltages at the open ends of the loop conductor is significantly great. Thus, a strong electric field can be induced at the slit 15 in response to the modulating signal. The induction of the strong electric field at the slit 15 results in an efficient modulation of the input light beam 16. It should be noted that the amplitudes of the voltages at the open ends of the loop conductor increase as the quality factor (Q) of the resonator 13 increases.

The loop conductor of the resonator 13 is preferably composed of a film of metal such as aluminum or gold. The loop conductor of the resonator 13 may also be composed of a film of superconductor. In this case, a very high Q of the resonator 13 is attained so that a remarkably efficient modulation of the input light beam 16 is realized.

It should be noted that a Mach-Zehnder interferometer may be formed on the substrate 11 by using a branch optical waveguide. In this case, an input light beam can be subjected to intensity modulation.

This embodiment may be modified as follows. In a first modification, a substrate is made of material other than LiNbO$_3$ (lithium niobate), and material exhibiting an electro-optical effect and having refractive indices higher than those of the substrate is formed into a film-shaped optical waveguide on the substrate. In a second modification, an upper surface of a substrate is formed with an optical-waveguide core portion having refractive indices higher than those of a surround, and an optical-waveguide cladding portion made of electro-optical material is formed on the core portion. In this case, optical modulation is executed by using an electric field of a light beam which extends out of the core portion.

DESCRIPTION OF THE SECOND PREFERRED EMBODIMENT

Figure 3:
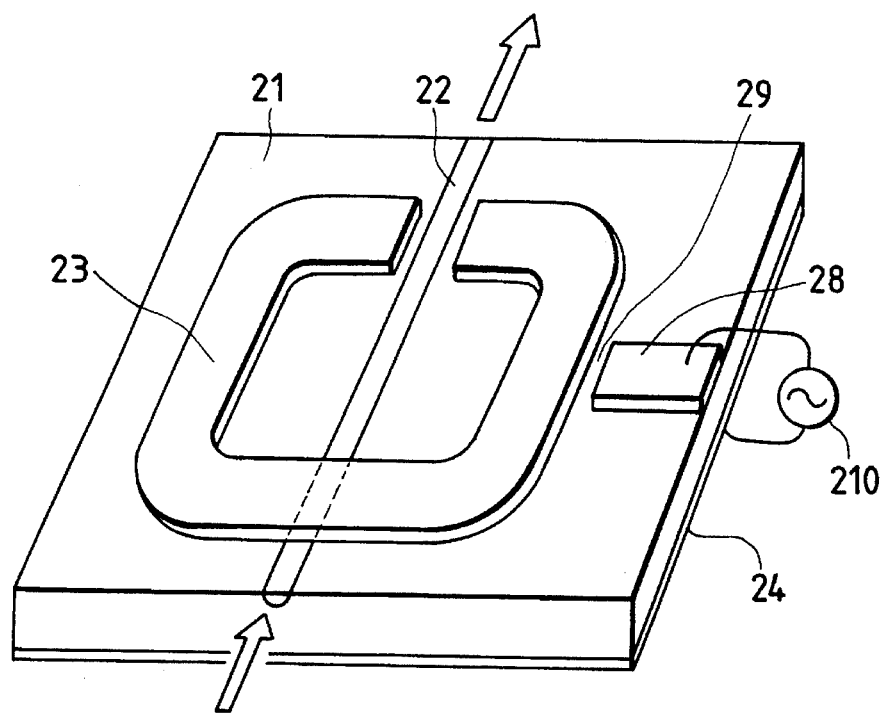
FIG. 3 is a perspective diagram of an optical modulation device according to a second embodiment of this invention.

With reference to FIG. 3, an optical modulation device (optical modulation element) includes a substrate 21. An optical waveguide 22 and a resonator 23 are formed on an upper surface of the substrate 21. A ground plane 24 is formed on a lower surface of the substrate 21. The substrate 21, the optical waveguide 22, the resonator 23, and the ground plane 24 are similar to the substrate 11, the optical waveguide 12, the resonator 13, and the ground plane 14 in the embodiment of FIGS. 1 and 2 respectively.

A signal input terminal 28 is formed on the upper surface of the substrate 21 simultaneously with the formation of the resonator 23. The input terminal 28 is spaced from a side of the resonator 23 by a gap 29 of a predetermined size. Thus, the input terminal 28 and the resonator 23 are capacitively coupled with each other. A signal source 210 for generating a modulating signal is electrically connected between the input terminal 28 and the ground plane 24 via suitable leads.

The modulating signal generated by the signal source 210 is applied between the input terminal 28 and the ground plane 24. A voltage depending on the modulating signal is induced in the resonator 23 via the capacitive coupling between the input terminal 28 and the resonator 23. In this way, the resonator 23 is driven in response to the modulating signal. Thus, a light beam traveling along the optical waveguide 22 is modulated with the modulating signal.

The degree of the coupling between the input terminal 28 and the resonator 23 is chosen so that the resonance operation of the resonator 23 can be optimized. It should be noted that the degree of the coupling between the input terminal 28 and the resonator 23 can be adjusted by varying the gap 29 therebetween or by shifting the place of the coupling to the resonator 23.

A photo-etching technique enables accurate and simultaneous formation of the resonator 23 and the input terminal 28.

This embodiment may be modified as follows. In a first modification, a separate capacitor is connected between the input terminal 28 and the resonator 23. In a second modification, an insulating film is formed on the resonator 23, and an input terminal corresponding to the input terminal 28 is formed on the insulating film.

DESCRIPTION OF THE THIRD PREFERRED EMBODIMENT

Figure 4:
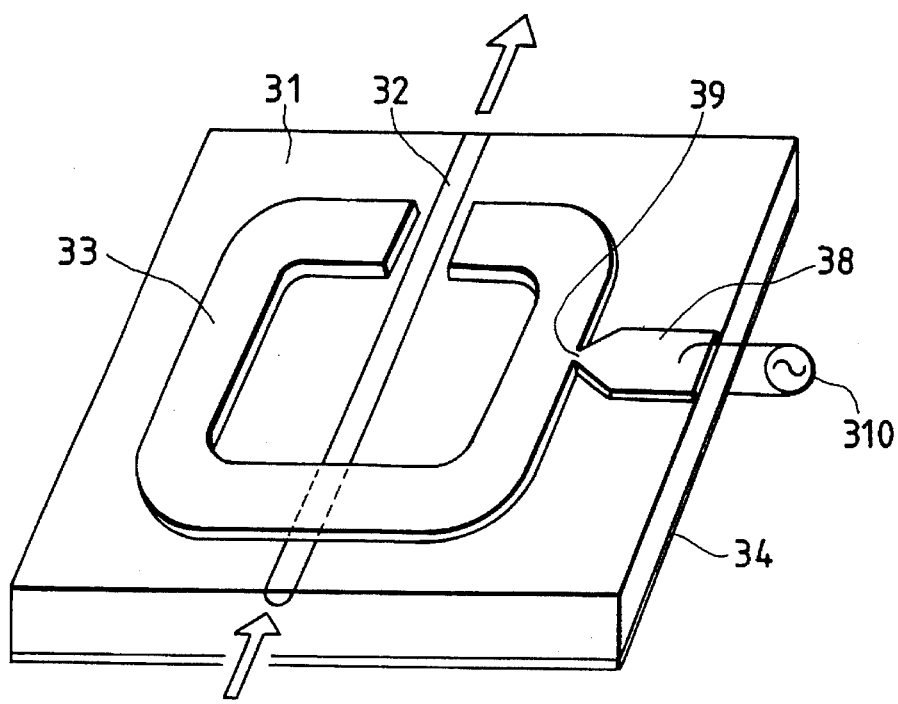
FIG. 4 is a perspective diagram of an optical modulation device according to a third embodiment of this invention.

With reference to FIG. 4, an optical modulation device (optical modulation element) includes a substrate 31. An optical waveguide 32 and a resonator 33 are formed on an upper surface of the substrate 31. A ground plane 34 is formed on a lower surface of the substrate 31. The substrate 31, the optical waveguide 32, the resonator 33, and the ground plane 34 are similar to the substrate 11, the optical waveguide 12, the resonator 13, and the ground plane 14 in the embodiment of FIGS. 1 and 2 respectively.

A signal input terminal 38 extending on the upper surface of the substrate 31 is connected and coupled to a side of the resonator 33 by a bridge or a constricted portion 39 made of conductive material. The input terminal 38, the resonator 33, and the constricted portion 39 are simultaneously formed by a suitable process such as a photo-etching process. It is preferable that the input terminal 38, the resonator 33, and the constricted portion 39 are integral with each other. A signal source 310 for generating a modulating signal is electrically connected between the input terminal 38 and the ground plane 34 via suitable leads.

The modulating signal generated by the signal source 310 is applied between the input terminal 38 and the ground plane 34. A voltage depending on the modulating signal is induced in the resonator 33 via the connection (coupling) between the input terminal 38 and the resonator 33. In this way, the resonator 33 is driven in response to the modulating signal. Thus, a light beam traveling along the optical waveguide 32 is modulated with the modulating signal.

The degree of the coupling between the input terminal 38 and the resonator 33 is chosen so that the resonance operation of the resonator 33 can be optimized. It should be noted that the degree of the coupling between the input terminal 38 and the resonator 33 can be adjusted by shifting the place of the coupling to the resonator 33.

It should be noted that the constricted portion 39 may be replaced by a conductive line.

DESCRIPTION OF THE FOURTH PREFERRED EMBODIMENT

Figure 5:
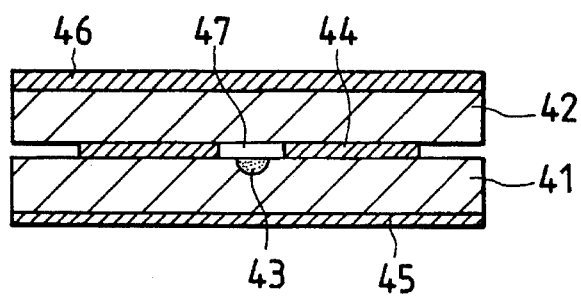
FIG. 5 is a sectional view of an optical modulation device according to a fourth embodiment of this invention.

FIG. 5 shows a fourth embodiment of this invention which is similar to the embodiments of FIGS. 1–4 except for design changes indicated hereinafter.

As shown in FIG. 5, the fourth embodiment includes a lower substrate 41. An optical waveguide 43 and a resonator 44 are formed on an upper surface of the lower substrate 41. A ground plane 45 is formed on a lower surface of the lower substrate 41. The lower substrate 41, the optical waveguide 43, and the ground plane 45 are similar to the substrate 11, the optical waveguide 12, and the ground plane 14 in the embodiment of FIGS. 1 and 2 respectively.

An upper dielectric substrate 42 extends on the resonator 44. Thus, the resonator 44 is sandwiched between the lower substrate 41 and the upper substrate 42. A ground plane 46 extends on an upper surface of the upper substrate 42.

The resonator 44 is of a split ring type (split loop type), having a strip line structure. Specifically, the resonator 44 has a rectangular loop or ring conductor with a slit (an opening or split) 47.

DESCRIPTION OF THE FIFTH PREFERRED EMBODIMENT

Figure 6:
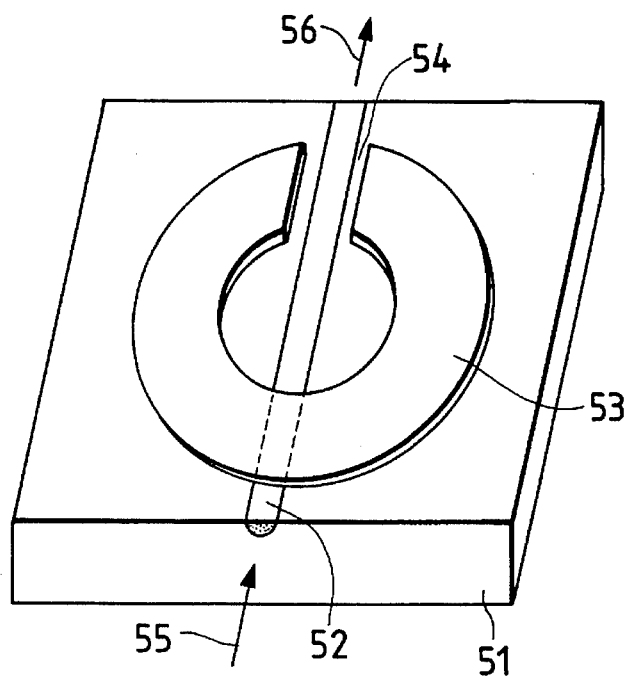
FIG. 6 is a perspective view of an optical modulation device according to a fifth embodiment of this invention.

With reference to FIG. 6, an optical modulation device (optical modulation element) includes a substrate 51 exhibiting an electro-optical effect. The substrate 51 has a shape of a rectangular or square flat plate. The substrate 51 is made of, for example, a single crystal of LiNbO$_3$ (lithium niobate).

An optical waveguide or an optical path 52 is formed in an upper surface of the substrate 51 by a suitable process such as a metal diffusion process or a Ti diffusion process. The optical waveguide 52 exhibits the electro-optical effect. The optical waveguide 52 extends between opposite sides of the substrate 51. After the formation of the optical waveguide 52, a split ring electrode 53 is formed on the upper surface of the substrate 51 by suitable processes such as a sputtering process, a process of photolithography, and a reactive ion etching process.

The split ring electrode 53 has a circular loop or ring conductor with a slit (an opening or split) 54. In FIG. 6, as viewed from the top, the optical waveguide 52 extends along a diametrical central line with respect to the circular ring conductor. In addition, the optical waveguide 52 extends through the slit 54. Thus, the optical waveguide 52 has a portion extending near the slit 54. The circular loop conductor is preferably gymmetrical with respect to the diametrical central line. The split ring electrode 53 is preferably composed of a film of metal such as aluminum or gold.

An input light beam 55 is applied to one end of the optical waveguide 52. The input light beam 55 enters the optical waveguide 52 via the end thereof and then travels along the optical waveguide 52, exiting from the other end of the optical waveguide 52 and forming an output light beam 56. While the input light beam 55 travels along the optical waveguide 52, it passes through a region near the slit 54 in the split ring electrode 53. In cases where the split ring electrode 53 is fed with a modulating signal by a suitable method, an electric field depending on the modulating signal is developed in the slit 54 and hence the refractive indices of the optical waveguide 52 are varied with the electric field due to the electro-optical effect. Specifically, the developed electric field has an amplitude which depends on the modulating signal. Therefore, the phase of the output light beam 56 is varied in accordance with the modulating signal. In this way, the input light beam 55 is phase-modulated with the modulating signal.

It should be noted that the split ring electrode 53 may have other shapes such as a rectangular shape.

The split ring electrode 53 has open ends which face each other at the slit 54. The feed of the modulating signal to the split ring electrode 53 produces a voltage therein. The amplitude of the voltage in the split ring electrode 53 is maximized at the open ends thereof. In addition, the voltages at the open ends of the split ring electrode 53 have opposite phases respectively. Therefore, the amplitude of the difference between the voltages at the open ends of the split ring electrode 53 is significantly great. Thus, a strong electric field can be induced at the slit 54 in response to the modulating signal. The induction of the strong electric field at the slit 54 results in an efficient modulation of the input light beam 55.

It should be noted that a Mach-Zehnder interferometer may be formed on the substrate 51 by using a branch optical waveguide. In this case, an input light beam can be subjected to intensity modulation.

This embodiment may be modified as follows. In a first modification, a substrate is made of material other than LiNbO$_3$ (lithium niobate), and material exhibiting an electro-optical effect and having refractive indices higher than those of the substrate is formed into a film-shaped optical waveguide on the substrate. In a second modification, an upper surface of a substrate is formed with an optical-waveguide core portion having refractive indices higher than those of a surround, and an optical-waveguide cladding portion made of electro-optical material is formed on the core portion. In this case, optical modulation is executed by using an electric field of a light beam which extends out of the core portion.

DESCRIPTION OF THE SIXTH PREFERRED EMBODIMENT

Figure 7:
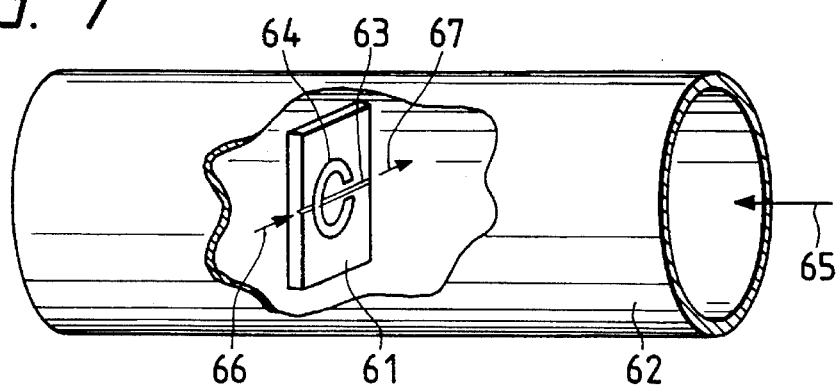
FIG. 7 is a partially cutaway view in perspective of an optical modulation device according to a sixth embodiment of this invention.

With reference to FIG. 7, an optical modulation device (optical modulation element) includes a substrate 61. An optical waveguide 63 and a split ring electrode 64 are formed on a surface of the substrate 61. The substrate 61, the optical waveguide 63, and the split ring electrode 64 are similar to the substrate 51, the optical waveguide 52, and the split ring electrode 53 in the embodiment of FIG. 6 respectively.

The substrate 61 with the optical waveguide 63 and the split ring electrode 64 is disposed within a circular (cylindrical) waveguide 62 fed with an electromagnetic wave or a radio wave 65 representing a modulating signal. A major plane of the substrate 61 is perpendicular to the axis of the circular waveguide 62. In addition, the optical waveguide 63 in the substrate 61 extends perpendicular to the axis of the circular waveguide 62. The split ring electrode 64 on the substrate 61 extends in a circumferential direction with respect to the circular waveguide 62.

An input light beam 66 can be applied to one end of the optical waveguide 63 via an optical fiber (not shown) extending into the circular waveguide 62. An output light beam 67 can be transmitted from the other end of the optical waveguide 63 via an optical fiber (not shown) extending through the walls of the circular waveguide 62.

The radio wave 65 representing the modulating signal propagates in the circular waveguide 62. The split ring electrode 64 is exposed to the radio wave 65 so that the modulating signal is induced therein. Thus, an electric field depending on the modulating signal is developed in a slit of the split ring electrode 64, and the refractive indices of the optical waveguide 63 are varied with the electric field due to the electro-optical effect. Specifically, the developed electric field has an amplitude which depends on the modulating signal. The input light beam 66 is applied to one end of the optical waveguide 63. The input light beam 66 enters the optical waveguide 63 via the end thereof and then travels along the optical waveguide 63, exiting from the other end of the optical waveguide 63 and forming the output light beam 67. While the input light beam 66 travels along the optical waveguide 63, it passes through a region near the slit in the split ring electrode 64. As previously described, the refractive indices of the optical waveguide 63 are varied with the electric field which depends on the modulating signal. Specifically, the refractive indices of the optical waveguide 63 are varied with the amplitude of the electric field. Therefore, the phase of the output light beam 67 is varied in accordance with the modulating signal. In this way, the input light beam 66 is phase-modulated with the modulating signal.

The radio wave 65 which propagates in the circular waveguide 62 is in a $TE_{0n}$ mode such as the $TE_{01}$ mode (the circular mode). An electric field in the $TE_{0n}$ mode extends in a circumferential direction with respect to the circular waveguide 62. The split ring electrode 64 also extends in the circumferential direction with respect to the circular waveguide 62. Therefore, the circular waveguide 64 and the split ring electrode 64 are closely coupled with each other so that the modulating signal is efficiently induced in the split ring electrode 64.

It should be noted that a Mach-Zehnder interferometer may be formed on the substrate 61 by using a branch optical waveguide. In this case, an input light beam can be subjected to intensity modulation.

What is claimed is:

1. An optical modulation device which transmits and modulates a light beam in response to an electric modulating signal, comprising:

a split ring resonator having a slit and resonating with the electric modulating signal; and an optical waveguide guiding the light beam and exhibiting an electro-optical effect, the optical waveguide having a portion located near the slit of the resonator so as to modulate a phase of the light beam guided by the optical waveguide in response to the electric modulating signal being present in the resonator;

wherein the optical waveguide is exclusive of a division into a plurality of sub optical waveguides.

2. The optical modulation device of claim 1, further comprising an input terminal, means for coupling the input terminal and the resonator with each other, and means for feeding the electric modulating signal to the input terminal.

3. The optical modulation device of claim 2, wherein the coupling means comprises means for capacitively coupling the input terminal and the resonator with each other.

4. The optical modulation device of claim 2, wherein the coupling means comprises a constricted conductor connected between the input terminal and the resonator.

5. The optical modulation device of claim 1, wherein said resonator is responsive to application of said electric modulating signal thereto by inducing an electric field at said slit thereof, and said optical waveguide is characterized by optical characteristics variable in response to application of an electric field thereto, thereby optically modulating the phase of the light beam guided by the optical waveguide in response to an electric field induced at said slit by application of the electric modulating signal to said resonator.

6. The optical modulation device of claim 1, wherein said optical waveguide is substantially linear and is disposed in a central portion of said split ring resonator and passes through said slit.

7. A method of transmitting and modulating a light beam by driving an optical modulation device including a split ring resonator having a slit, and an optical waveguide exhibiting an electro-optical effect and having a portion located near the slit of the resonator, the optical waveguide being exclusive of a division into a plurality of sub optical waveguides, the method comprising the steps of:

applying a light beam to the optical waveguide; and inducing an electric voltage in the resonator in response to an electric modulating signal so as to modulate a phase of the light beam guided by the optical waveguide in response to the electric modulating signal.

8. The method of claim 7, wherein said split ring resonator is responsive to said electric modulating signal thereto by inducing an electric field at said slit thereof, and said optical waveguide is responsive to application of an electric field thereto by varying optical characteristics thereof, comprising the further steps of:

inducing an electric field at said slit by applying said electric modulating signal to said split ring resonator and applying to said optical waveguide the electric field induced at said slit, thereby optically modulating the phase of the light beam guided by the optical waveguide in response to an electric field induced at said slit by application of the electric modulating signal to said resonator.

9. An optical modulation device for modulating a light beam transmitted therethrough in response to an electric modulating signal, comprising:

a split ring electrode having a slit and conducting the electric modulating signal; and an optical waveguide guiding the light beam and exhibiting an electro-optical effect, the optical waveguide having a portion located near the slit of the electrode so as to modulate a phase of the light beam guided by the optical waveguide in response to the electric modulating signal conducted by the electrode;

wherein the optical waveguide is exclusive of a division into a plurality of sub optical waveguides.

10. The optical modulation device of claim 9, further comprising means for feeding the electric modulating signal to the electrode.

11. The optical modulation device of claim 9, wherein said split ring electrode is responsive to said electric modulating signal applied thereto by generating an electric field at said slit thereof, and said optical waveguide is characterized by optical characteristics variable in response to application of an electric field thereto, thereby optically modulating the phase of the light beam guided by the optical waveguide in response to an electric field induced at said slit by application of the electric modulating signal to said split ring electrode.

12. The optical modulation device of claim 9, wherein said optical waveguide is substantially linear and is disposed in a central portion of said split ring electrode and passes through said slit.

13. An optical modulation device comprising:

a split ring electrode having a slit;

an optical waveguide exhibiting an electro-optical effect and having a portion located near the slit of the electrode; and means for feeding a modulating signal to the electrode;

wherein the feeding means comprises a radio waveguide for guiding a radio wave representing the modulating signal, the radio waveguide containing the electrode and the optical waveguide.

14. The optical modulation device of claim 13 wherein the radio waveguide comprises a circular radio waveguide, and the electrode extends in a circumferential direction with respect to the circular radio waveguide.

15. A method of transmitting and modulating a light beam by driving an optical modulation device including a split ring electrode having a slit, and an optical waveguide exhibiting an electro-optical effect and having a portion located near the slit of the electrode, the optical waveguide being exclusive of a division into a plurality of sub optical waveguides, the method comprising the steps of:

applying a light beam to the optical waveguide; and feeding an electric modulating signal to the electrode so as to modulate a phase of the light beam guided by the optical waveguide in response to the electric modulating signal.

16. The method of claim 15, wherein said split ring electrode is responsive to said electric modulating signal thereto by inducing an electric field at said slit thereof, and said optical waveguide is responsive to application of an electric field thereto by varying optical characteristics thereof, comprising the further steps of:

inducing an electric field at said slit by applying said electric modulating signal to said split ring electrode, and applying to said optical waveguide the electric field induced at said slit, thereby optically modulating the phase of the light beam guided by the optical waveguide in response to an electric field induced at said slit by application of the electric modulating signal to said split ring electrode.

* * * * *